C. A. HAGADONE.
CORN HARVESTER AND HUSKER.
APPLICATION FILED JULY 26, 1915.

1,221,316.

Patented Apr. 3, 1917.

Inventor:
Clinton A. Hagadone,
By Chas. E. Lord
Atty.

UNITED STATES PATENT OFFICE.

CLINTON A. HAGADONE, OF WESTERN SPRINGS, ILLINOIS, ASSIGNOR TO INTERNATIONAL HARVESTER COMPANY OF NEW JERSEY, A CORPORATION OF NEW JERSEY.

CORN HARVESTER AND HUSKER.

1,221,316.      Specification of Letters Patent.      Patented Apr. 3, 1917.

Application filed July 26, 1915. Serial No. 41,972.

*To all whom it may concern:*

Be it known that I, CLINTON A. HAGADONE, a citizen of the United States, residing at Western Springs, in the county of Cook and State of Illinois, have invented certain new and useful Improvements in Corn Harvesters and Huskers, of which the following is a full, clear, and exact specification.

This invention relates to corn harvesters and huskers, and in particular to means for mounting the ears elevator upon the frame of the machine, whereby it may be readily attached or detached, and carrying with it as a unitary structure all of its operative parts.

One object of the invention is to facilitate the assembling and disassembling of an elevator with its coöperative parts with respect to the machine proper.

Another object is to provide improved supports for the bearing boxes, having the driving shaft of the elevator journaled therein, and having the clutch mechanism connected with the shaft and the clutch shipping mechanism carried by the bearing boxes.

I attain these objects by means of the mechanism illustrated in the accompanying drawing, in which—

Figure 1 is a side elevation of part of a corn harvester and husker having my invention embodied in its construction;

Fig. 2 is a sectional view taken in the plane of line 2—2 of Fig. 1; and

Fig. 3 is a detail part of the mechanism.

Referring to the drawings, wherein the same reference characters designate like parts throughout the several views, 1 represents an outside member of a pair of wheel frame members of the machine, and 1ª an inside member, 2 an axle bearing secured between the two members, 3 a side member of a frame carrying the husking mechanism, turned downward at the delivery end of the mechanism and secured to the frame members 1 and 1ª, and 4 represents a frame supporting member connecting the member 3 with the axle member 2. 5 represents the operator's seat carried by a member 6 secured to the wheel frame members 1 and 1ª. 7 and 8 represent front and rear laterally and downwardly inclined bracket members secured to the frame members 1 and 1ª, and provided with forked openings at their free ends that receive tubular bearing boxes 9 provided with circumferential channels 10 that receive the bracket members and securing members 11 that are received by vertically disposed openings in the ends of the forked members whereby the bearing boxes are detachably connected with the supporting brackets. The bearing boxes are provided with flange members 12, having the lower ends of the side members of a conveyer trough 13 secured thereto, and 14 represents an adjustable coupling connecting the upper end of the trough with the standard 15 secured to the wheel frame. 16 represents an elevator gear driving shaft journaled in the bearing boxes 9 and having a clutch member 17 slidably mounted upon its free end and adapted to engage with a clutch member 18 forming part of a coupling member 19 that operatively engages with a coacting coupling member 20 secured to the front end of a coupling shaft 21, said shaft having its rear end connected, by means of a coupling member 22, with a coacting coupling member 23 secured to the front end of a driving shaft 24 journaled in a bearing sleeve 25 secured to the main frame of the machine.

The clutch member 17 is provided with a longitudinally disposed elongated opening that receives a pin 26 whereby it is slidably secured to the shaft 16, and 27 represents a compression spring operative between the pin and a flange 28 on the clutch member to normally hold the coacting clutch members in engagement.

Means are provided for disengaging the clutch mechanism including a lever having a forked end 29 engaging with the flange 28 and pivoted intermediate its ends to a rearwardly extending arm 30 integral with the bearing box 9 carried by the bracket 8, and its lower end connected with one end of a link 31, having its opposite end connected with one arm of a bell crank lever 32 pivoted upon an arm 33 integral with the bearing box 9 carried by the bracket 7, the remaining arm of the bell crank lever being pivotally connected with the lower end of a foot tripping member 34 that is slidably received by an opening 35 in a laterally extending ear member 36 integral with the bearing box 9 carried by the bracket 7. The tripping member 34 extends above the ear 36 and is provided at its upper end with a laterally extending head 37 disposed convenient for the foot of the operator, and near its middle with a notch 38 adapted to engage with the ear 36 when the tripping member is depressed in a manner to hold the clutch members disengaged against the pressure of the spring 27.

By means of the mechanism the elevator is permitted to swing about the axis of the shaft 16 as controlled by the adjustable coupling. In disassembling the machine the securing members 11 are removed and all of the operative parts of the elevator, including the clutch mechanism, are removed with the elevator trough.

Having shown and described one embodiment of my invention, I do not desire that it be confined to the precise structural details as illustrated, it being understood that changes may be made in form and proportion of parts without departing from the spirit of my invention, as indicated by the appended claims.

What I claim as my invention, and desire to secure by Letters Patent, is:

1. A corn harvester and husker including, in combination, a wheel frame, an elevator including a conveyer trough, said trough having bearing boxes secured thereto, an elevator driving shaft journaled in said bearing boxes, clutch mechanism mounted upon said shaft, clutch shipping mechanism mounted upon said bearing boxes, and means for detachably connecting said bearing boxes with said wheel frame.

2. A corn harvester and husker including, in combination, a wheel frame, an elevator including a conveyer trough, said trough having bearing boxes secured thereto, an elevator driving shaft journaled in said bearing boxes, clutch mechanism mounted upon said shaft, clutch shipping mechanism mounted upon said bearing boxes, and means for detachably connecting said bearing boxes with said wheel frame, said means including bracket members having one end secured to said wheel frame and their opposite ends provided with forked members adapted to receive said bearing boxes.

3. A corn harvester and husker including, in combination, a wheel frame, an elevator including a conveyer trough, said trough having bearing boxes secured thereto, an elevator driving shaft journaled in said bearing boxes, clutch mechanism mounted upon said shaft, clutch shipping mechanism mounted upon said bearing boxes, and means for detachably connecting said bearing boxes with said wheel frame, said means including bracket members having one end secured to said wheel frame and their opposite ends provided with forked members adapted to releasably and rotatably receive said bearing boxes, and securing members received by openings in the ends of said bearing boxes and securing said bearing boxes in operative position.

4. A corn harvester and husker including, in combination, a wheel frame, an elevator including a conveyer trough, said trough having bearing boxes secured to opposite sides thereof, said bearing boxes having peripheral channels, an elevator driving shaft journaled in said bearing boxes, a clutch mechanism mounted upon said shaft, clutch shipping mechanism mounted upon said bearing boxes, bracket members having one end secured to said wheel frame and their opposite ends provided with forked members adapted to be received by the channels upon said bearing boxes, and securing members received by openings in the ends of said forked members and securing said bearing boxes in operative position.

5. A corn harvester and husker including, in combination, a wheel frame, an elevator including a conveyer trough, said trough having bearing boxes secured to opposite sides thereof, said bearing boxes having peripheral channels, an elevator driving shaft journaled in said bearing boxes, a clutch mechanism mounted upon said shaft, depending arms integral with said bearing boxes, a clutch shipping lever pivotally mounted upon one of said arms, having one end engaging with said clutch mechanism, a link having one end connected with the opposite end of said lever, a bell crank lever pivotally mounted upon the remaining arm, one arm of said lever connected with the opposite end of said link, a foot engaging member pivotally connected with the remaining arm of the bell crank lever, and means for detachably connecting said bearing boxes with said wheel frame.

6. A corn harvester and husker including, in combination, a wheel frame, an elevator including a conveyer trough, said trough having bearing boxes secured to opposite sides thereof, said bearing boxes having peripheral channels, an elevator driving shaft journaled in said bearing boxes, a clutch mechanism mounted upon said shaft, depending arms integral with said bearing boxes, a clutch shipping lever pivotally mounted upon one of said arms, having one end engaging with said clutch mechanism, a link having one end connected with the opposite end of said lever, a bell crank lever pivotally mounted upon the remaining arm, one arm of said lever connected with the opposite end of said link, a foot engaging member pivotally connected with the remaining arm of the bell crank lever, and means for detachably connecting said bearing boxes with said wheel frame, said means including bracket members having one end thereof secured to the wheel frame and their opposite ends provided with forked members adapted to be releasably received by the channels on said bearing boxes, and securing members received by openings in the ends of said forked members and securing said bearing boxes in operative position.

7. A corn harvester and husker including, in combination, a wheel frame, an elevator including a conveyer trough, said trough having bearing boxes secured to opposite sides thereof, said bearing boxes having peripheral channels, an elevator driving shaft journaled in said bearing boxes, a clutch mechanism mounted upon said shaft, depending arms integral with said bearing boxes, a clutch shipping lever pivotally mounted upon one of said arms, having one end engaging with said clutch mechanism, a link having one end connected with the opposite end of said lever, a bell crank lever pivotally mounted upon the remaining arm, one arm of said lever connected with the opposite end of said link, a foot engaging member pivotally connected with the remaining arm of the bell crank lever, and means for detachably connecting said bearing boxes with said wheel frame, said means including bracket members having one end thereof secured to said wheel frame and their opposite ends provided with forked members adapted to be releasably received by the channels on said bearing boxes, securing members received by openings in the ends of said forked members and secured to said bearing boxes in a manner permitting a rotative movement thereof, and an adjustable connection between the upper end of said conveyer trough and said wheel frame.

8. A corn handling machine including, in combination, a wheel frame, an elevator trough removably connected thereto, elevator operating mechanism, and control means therefor, said trough and control means being removable from said wheel frame as a unit.

9. A corn handling machine including, in combination, a wheel frame, an elevator including a conveyer trough, said trough having bearing boxes secured thereto, driving means journaled in said bearing boxes, control means for said driving means mounted upon said bearing boxes, and means for detachably connecting said bearing boxes with said wheel frame.

In testimony whereof I affix my signature.

CLINTON A. HAGADONE.

Copies of this patent may be obtained for five cents each, by addressing the "Commissioner of Patents, Washington, D. C."